Figure 9:
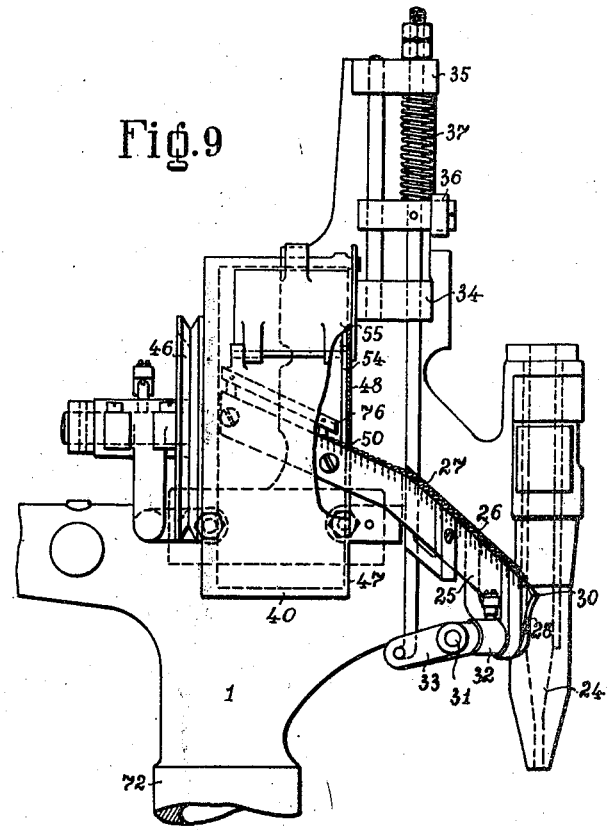

C. SATTLER.
MACHINE FOR NAILING UPPERS TO SOLES.
APPLICATION FILED FEB. 6, 1911.
1,023,337.
Patented Apr. 16, 1912.
6 SHEETS—SHEET 1.
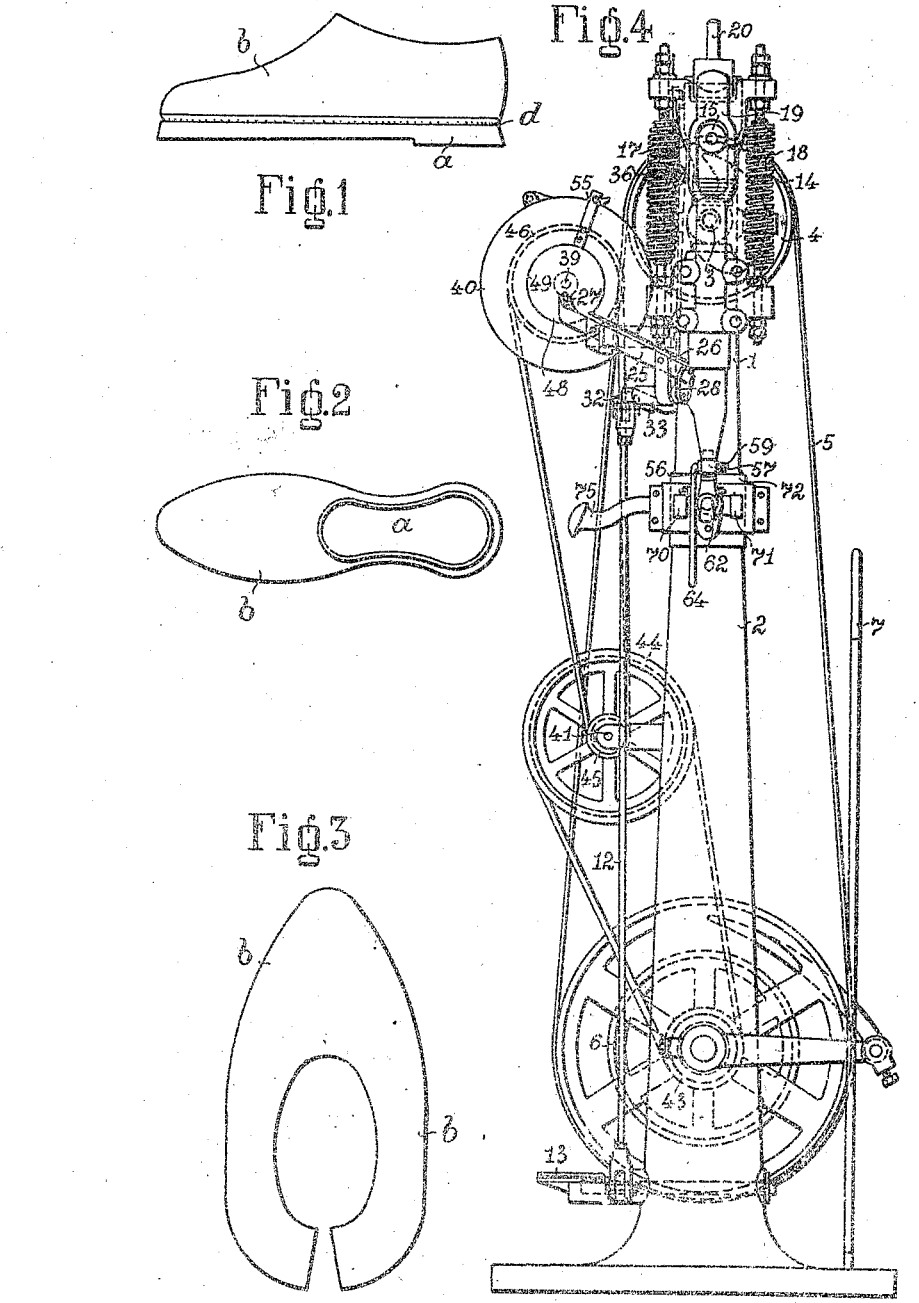
WITNESSES:
Olive D. White
Helen S. Morris
CARL SATTLER
INVENTOR
By
ATTORNEY

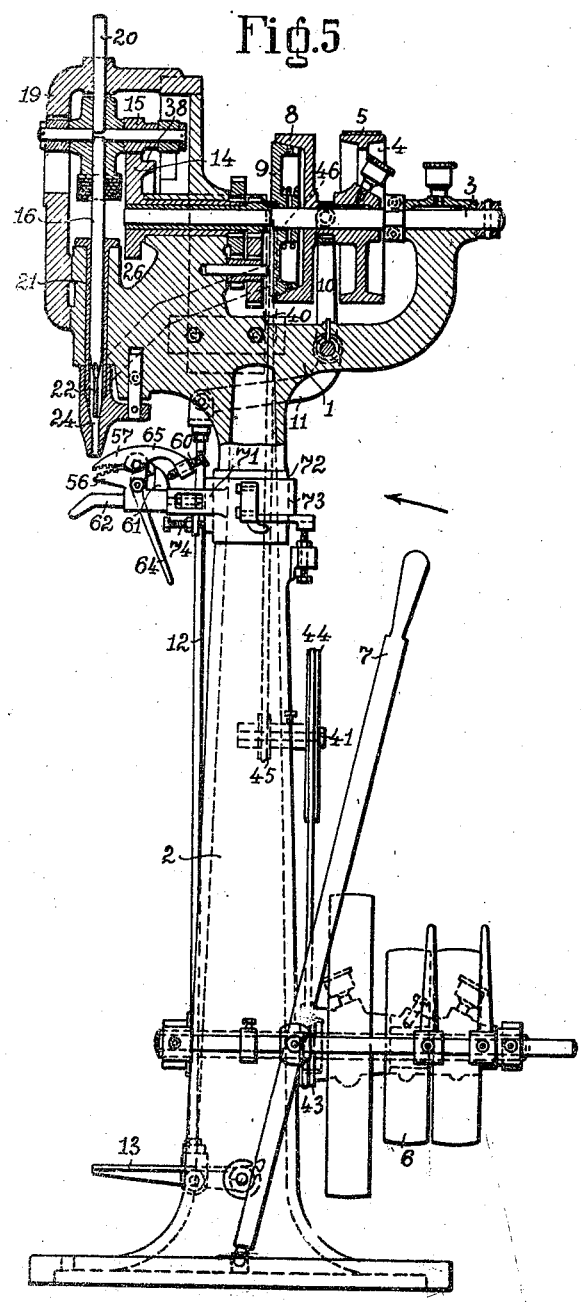

C. SATTLER.
MACHINE FOR NAILING UPPERS TO SOLES.
APPLICATION FILED FEB. 6, 1911.
1,023,337.
Patented Apr. 16, 1912.
6 SHEETS—SHEET 3.
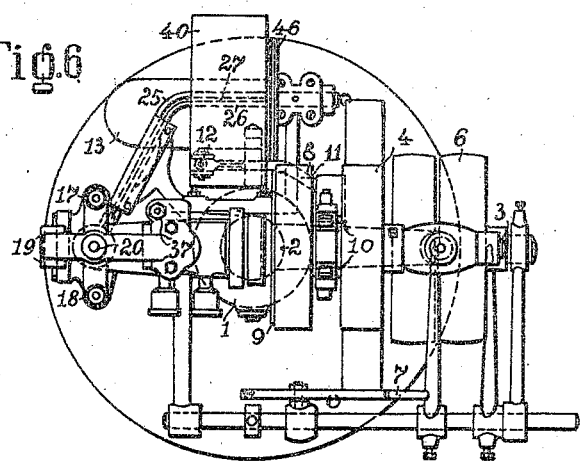
Fig.6
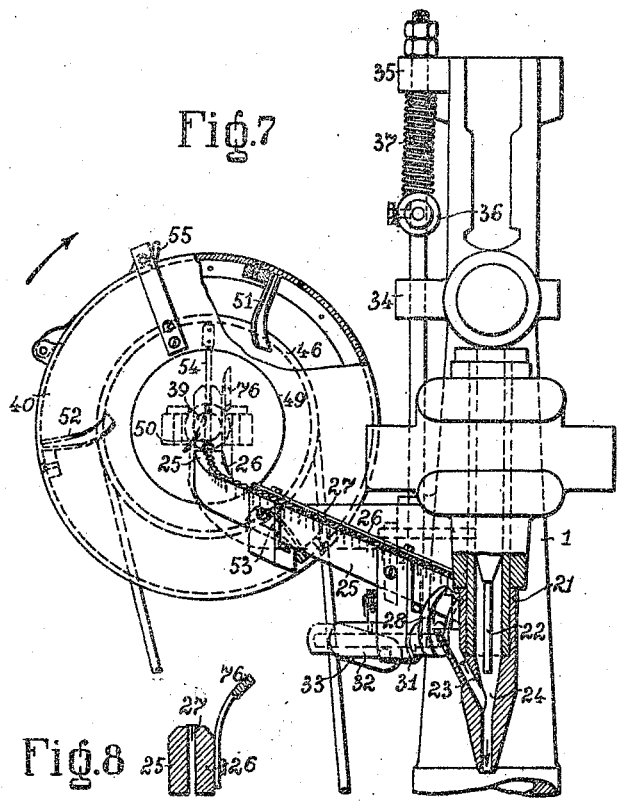
Fig.7
Fig.8
WITNESSES:
Olive D. White
Helen S. Morris
CARL SATTLER
INVENTOR
By
ATTORNEY.

C. SATTLER.
MACHINE FOR NAILING UPPERS TO SOLES.
APPLICATION FILED FEB. 6, 1911.

1,023,337.

Patented Apr. 16, 1912.

6 SHEETS—SHEET 4.

WITNESSES:
Olive D. White
Helen S. Morris

CARL SATTLER
INVENTOR

By
ATTORNEY

C. SATTLER.
MACHINE FOR NAILING UPPERS TO SOLES.
APPLICATION FILED FEB. 6, 1911.

1,023,337.

Patented Apr. 16, 1912.

WITNESSES:
Olive D. White
Helen S. Morris

Carl Sattler
INVENTOR

ATTORNEY

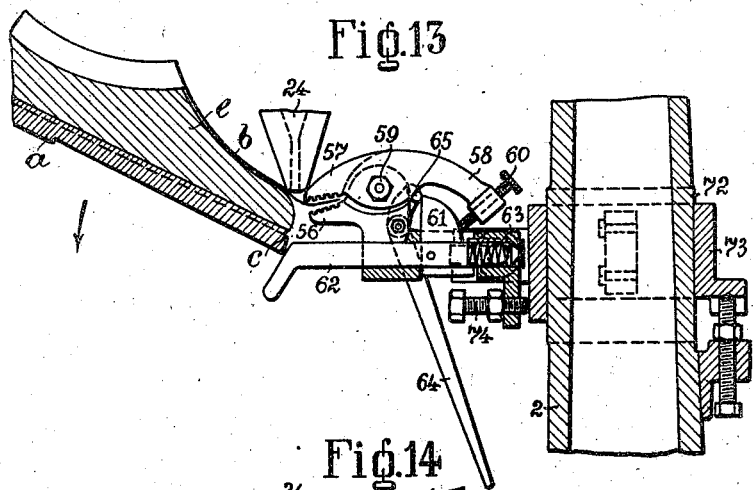
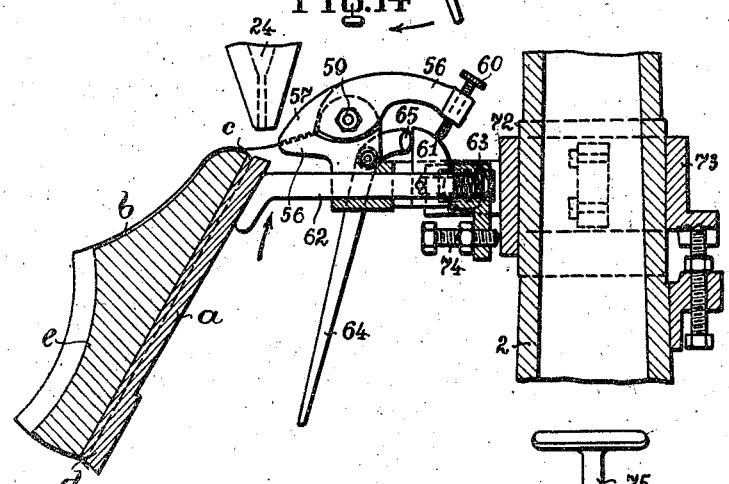
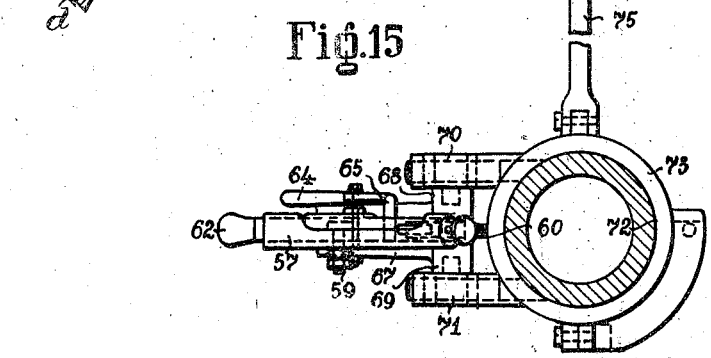

UNITED STATES PATENT OFFICE.

CARL SATTLER, OF STEGLITZ, BERLIN, GERMANY.

MACHINE FOR NAILING UPPERS TO SOLES.

1,023,337.  Specification of Letters Patent.  Patented Apr. 16, 1912.

Application filed February 6, 1911. Serial No. 606,726.

*To all whom it may concern:*

Be it known that I, CARL SATTLER, engineer, a subject of the King of Prussia, and residing at Stubenrauch-Platz 3, Steglitz, Berlin, Germany, have invented new and useful Improvements in Machines for Nailing Uppers to Soles, of which the following is a specification.

This invention relates to a machine for nailing uppers to such soles which bear nailing, preferably to wooden soles, and consists in feeding before each blow of the hammer a nail below the hammer to be driven through the upper which is tightly drawn over a last into the wood by one blow of the hammer.

To this end the machine consists first of a hammer device for driving in the nails, second of a device for storing and feeding the nails below the hammer and third of a device for drawing the upper tightly over the last.

With the above objects in view, I have hereinafter fully set forth and described my invention, with reference to the accompanying drawings, in which like reference numerals indicate like parts throughout.

Figure 10:
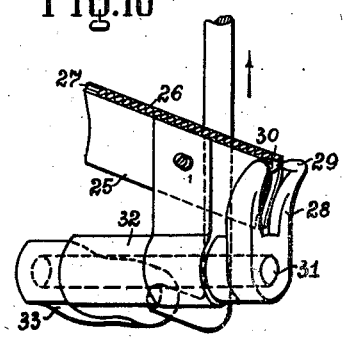
Figure 11:
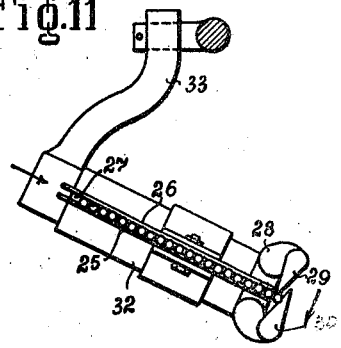
Figure 12:
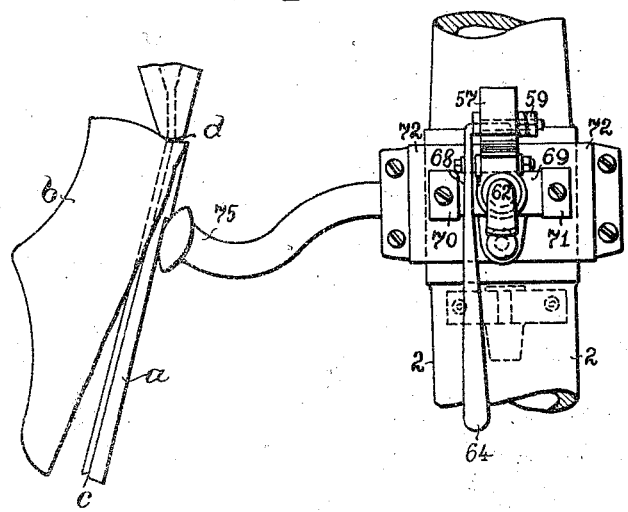
Figure 16:
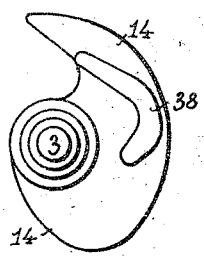
Figure 17:
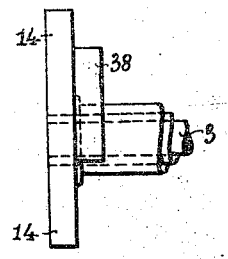

Figure 1 shows a shoe with a wooden sole produced by the machine. Fig. 2 a plan thereof. Fig. 3 the upper developed. Fig. 4 a front view of the machine. Fig. 5 is a side view of the machine and section through the driving mechanism of the hammer. Fig. 6 is a plan thereof. Fig. 7 shows on an enlarged scale a front view of the nail-feeding device and a section at the place where the nails enter. Fig. 8 is a vertical section through the storing channel at the place where the nails enter. Fig. 9 is a side-view of Fig. 7. Figs. 10 and 11 show respectively a side view and a plan of the nail-receiver in front of the storing channel. Fig. 12 shows the device for preliminary nailing the shoe. Fig. 13 shows the parts of the device shown in Fig. 12 in another position. Fig. 14 shows the same device as Fig. 12 with parts in yet another position. Fig. 15 is a plan of Fig. 14. Figs. 16 and 17 are respectively a side view and a front view of the cam disk for actuating the hammer and the nail receiver.

In carrying out my invention and referring to the embodiment shown in the drawings, —$a$— is the wooden sole, Figs. 1, 2, 14 and 15, to which the upper —$b$— is to be nailed. In order to prevent the nailheads from projecting from the surface of the wood sole, a groove —$c$— is cut all around into the same below its top edge, into the inner edge —$d$— of which the nails are driven in the direction shown, after the upper has been drawn tight over the last.

In the upper part —1— Figs. 4, 5 and 6 of the frame 2 is mounted a shaft 3 upon which is keyed a pulley 4 which has motion imparted by the belt 5 and the pulley 6 on the driving shaft. This drive may be uncoupled by means of the hand-lever 7, Fig. 5. Upon the shaft 3 is also employed the friction-clutch 8, 9, the cone 8 of which is loose and slidable and can be brought in engagement with the cone 9 by means of the lever 10, 11, rod 12 and pedal 13. At the end of the shaft 3 is secured the cam disk 14, Figs. 5, 16 and 17, upon the periphery of which rests the roller 15 of the hammerhead 16 placed under the influence of the springs 17, 18 in tension, Fig. 4. The hammer-head is longitudinally guided in the upper part of the casing 19 surrounding the cam-disk 14 by means of the rod 20 and in the lower part 21 by means of the hammer 22. The lower end of the hammer guide tapers off to a point and serves for the reception and the transmission of the nails one of which will always pass through the side-channel 23 and enter into the space 24 below the hammer 22 before each blow.

The nails are positioned behind each other, Figs. 10 and 11, in a channel 27 formed by two rails 25 and 26, the mouth of the said channel being closed during each blow of the hammer by means of a nail receiver 28 consisting of two prongs 29 and 30, the said prongs are so displaced behind each other as to form a slit between them through which the front nail can pass each time the slit is turned into the direction of the channel 27. This turning of the slit is effected by providing the shaft 31 of the nail-receiver 28 mounted in the bearing 32 with a lever 33, the free end of which is connected with a rod guided in the projection 34, 35 of the cam-casing 19 and having attached a roller 36. This roller is under the influence of the spring 37 and raised by a cam 38 cast in one with the cam 14.

The nails are fed into the channel 27 by the drum 40 secured upon the shaft 39, Figs. 4, 6, 7 and 9, filled with nails and slowly rotated by means of the intermediate drive 43, 44, 45 and 46. The rope pulley 46 is situated adjacent to the nail drum 40. On the side opposite to the rope pulley 46 project through the side 47 of the drum 40 the inclined rails 25 and 26, and at this point the drum 40 has a round plate covering the drum opening 49 and having at its exit an aperture 50 for the nail heads. The wings 51, 52 and 53 arranged on the interior of the drum 40 serve to raise the nails, to slip off as the wings arrive opposite to the channel 27 and fall against a baffle-plate 76, Fig. 8, from which they are conveyed to and cause to drop in the direction of the channel 27. There being always a considerable number of nails in the drum at least one nail will always fall into the position suitable for entering the channel 27 and form with those following a continuous row or supply. In order that nails which may come to lie across the channel 27 will not interfere with the formation of the row of nails, a spring-catch, 54, Fig. 9, is secured to the side of the drum 40, the free end of which glides over the top edge of the rails, 25 and 26 and strips off the nails resting on the top immediately in front of the exit opening. In order to permit of charging the drum 40 with nails, its periphery is provided with an opening which can be closed by a lid 55.

Below the hammer 22 is situated the device for clamping the upper —b— over the last —c— for the purpose of bringing the upper around the last. The said device consists of two grippers 56 and 57, 58, Figs. 13, 14 and 15, the upper one 57, 58 forming a double-armed lever on the stud 59 and the free end of which has a set-screw 60 bearing against the curved part of an abutment piece 61 which is rigidly connected with the sole rest 62 and is under the influence of a spring 63. A second abutment-piece 65 is provided having a handle 64 by means of which the abutment-piece 61 can also be displaced by hand against the pressure of the spring 63. All these parts are arranged along the rest 62 guided in the bracket 67. The bracket 67 has two pivots 68 and 69 which engage in eyes 70 and 71 carried by the neck 72 of the machine-stand. The down movement of the bracket 67 can be limited by the set-screw 74. On the ring 73 is arranged a second rest 75, Fig. 12, approximately at an angle of 90 degrees to the first rest 62 and the length of which is so calculated that when turned underneath the hammer the groove of the work placed against the rest is situated underneath the hammer, that is to say the path of the hammer intersects the inclined side of the groove about half-way. In order to insure of bringing the point of work where the nail requires driving in always below the hammer, the face of the rest 62 forms a strong convex curve.

The work is nailed in the following manner: It is assumed that the channel 27 has been already fed with nails and the drive of the machine is put in gear. To commence, the workman sitting in front of the machine turns the rest 75 below the hammer, places the edge of the upper into the groove on the heel of the sole and then depressing the pedal 13 brings by means of the lever and rod 10, 11 and 12 the coupling into engagement which causes the shaft 3 with its cam 14 to rotate. The hammer 22 being raised by the cam 14, the springs 17 and 18 will be compressed and when the roller 15 leaves the cam 14, are released and cause the hammer to strike. The blow of the hammer drives the nail below with one blow into the sole, the workman holding the work fast with both hands. Owing to the strongly curved surface of the rest 75, the workman has sufficient freedom of motion to insure of bringing the nail-groove below the hammer. The workman then drives a second nail in about one centimeter away from the first one, after which he brings the coupling out of engagement. The upper is then raised, the last placed in and the toe of the work brought forward, it being essential to hold the upper securely against the edge in order that it will conform with the last. For this purpose the workman turns the rest 62 with the drawing-over device below the hammer, places the edge of the upper into the open mouth of the gripper and presses the sole against the rest. During this movement the abutment passes the lever arm 58 upward, so that the gripper mouth closes. This pressure is maintained and the sole on the rest is brought from the position of Fig. 13 into the position of Fig. 14 until the inner edge of the groove coincides with the path of the hammer and approximately halves the inclined side of the groove. In this position of the sole, in which the upper is drawn over or in front the heel to the toe for the purpose of causing the upper to lay well against the last, the workman brings the coupling 8, 9 in engagement again to drive in a nail. Afterward the workman relieves the pressure against the rest, so that the upper is freed and thereby the gripper becomes free to clamp (say about one centimeter farther away) another part of the upper and secure the same by driving in a nail. For this purpose the workman draws the upper, as previously, tight, brings the groove again into the path of the hammer so that the second nail can be driven in. In the same manner he drives a few nails in at each side. The upper having thus been secured to the sole at the principal places (heel, toe and sides) the workman moves the work along the rest from the heel to the toe (or vice versa) in the meantime exerting pressure thereon and with each blow of the hammer drives in a nail at distances of about one centimeter. When continuing the nailing the use of the grippers is discontinued, the upper being secured at four points having been drawn sufficiently tight over the last and already brought into form.

If the workman has had some practice he need not bring the coupling again out of engagement to continue the nailing which otherwise would be essential, as between the first and second blow of the hammer, due to the oscillation of the nail-receiver 28, a nail has already been brought out of the nail-channel through the guide-groove 23 below the hammer 22. The oscillation of the nail-receiver and the distance at which its two prongs are situated from each other is so calculated that when one of the prongs has liberated the front nail, its passage is freed and the other prong holds back the bulk of the nails in the channel.

When placing the sole against the rest and the introducing edge of the upper into the mouth of the gripper, owing to the pressure of the work upon the sole rest, the gripper cannot at once close sufficiently to hold it securely to be drawn over the last. For this reason the handle 64 is provided, which when turned in the direction of the arrow moves the abutment 65 at the beginning forward against the abutment-piece 61 and thereby draws with it the rest against which the work bears. After the upper is held securely the sole can then be further pressed against the rest until the groove is brought again in the path of the hammer.

What I claim is:—

1. A machine for nailing uppers to soles, comprising in combination a frame, a hammer, means for raising said hammer, resilient means for driving said hammer, nail feeding means operated by said hammer-driving means for presenting the nails singly below said hammer, a shoe rest and coöperating gripping means.

2. A machine for nailing uppers to soles, comprising in combination, a frame, a hammer, means for raising said hammer, means for driving said hammer, nail feeding means, a shoe rest, and means actuated by pressure on said shoe rest for gripping the shoe upper.

3. A machine for nailing uppers to soles, comprising in combination, a frame, a hammer, means for raising said hammer, means for driving said hammer, nail feeding means, a resiliently mounted shoe rest, means mounted adjacent said shoe rest for gripping the shoe upper, means whereby said upper gripping means will be automatically closed by pressure on the shoe rest, said pressure also acting on the rest to bring the shoe in nailing position.

4. A machine for nailing uppers to soles, comprising in combination, a frame, a hammer, means for raising said hammer, means for driving said hammer, nail feeding means, a resiliently mounted shoe rest, means mounted adjacent said shoe rest for gripping the shoe upper, means whereby said upper gripping means will be automatically closed by pressure on the shoe rest, and auxiliary means for manually actuating said gripper ahead of the automatic action of the shoe rest.

5. A machine for nailing uppers to soles, comprising in combination, a frame, a hammer, means for raising said hammer, resilient means for driving said hammer, nail feeding means, means operated by said hammer driving means for presenting the nails singly below said hammer a shoe rest and means for gripping a shoe-upper by pressure on said rest, said means for presenting nails singly below said hammer comprising a shaft revoluble longitudinally below said nail feeding means, a nail receiver on said shaft and movable transversely across the mouth of said feeding means, overlapping prongs extending inwardly across said mouth, said prongs forming a diagonal feed channel to said hammer, and a connection with said driving means.

6. A machine for nailing uppers to soles, comprising in combination, a frame, a hammer, means for raising said hammer, resilient means for driving said hammer, a tubular housing surrounding said hammer, a nail feeding means, a passageway leading from said nail feeding means through the side of said housing below said hammer, means actuated by said hammer driving means for releasing nails one by one into said passageway, a shoe rest and means for gripping a shoe-upper by pressure on said rest.

7. A machine for nailing uppers to soles, comprising, in combination, a frame, a hammer, means for raising said hammer, means for driving said hammer, nail feeding means, a bracket carried by said frame, a resiliently extended shoe rest slidable therein below said hammer, gripping jaws carried by said bracket, and a connection between said rest and said jaws, whereby pressure on the former closes said jaws to grip the shoe upper.

In witness whereof I have hereunto set my hand in the presence of two witnesses.

CARL SATTLER.

Witnesses:
HENRY HASPER,
WOLDEMAR HAUPT.